(12) United States Patent
Scarbrough et al.

(10) Patent No.: US 7,290,803 B2
(45) Date of Patent: Nov. 6, 2007

(54) REFLECTIVE ARTICLE AND METHOD OF MANUFACTURING SAME

(75) Inventors: Joel Scott Scarbrough, Burlington, WI (US); Daniel C. Faul, West Bend, WI (US); Louis LaSorsa, Waynesboro, PA (US)

(73) Assignee: Serigraph Inc., West Bend, WI (US)

( * ) Notice: Subject to any disclaimer, the term of this patent is extended or adjusted under 35 U.S.C. 154(b) by 566 days.

(21) Appl. No.: 10/376,130

(22) Filed: Feb. 28, 2003

(65) Prior Publication Data

US 2004/0140665 A1 Jul. 22, 2004

Related U.S. Application Data

(63) Continuation-in-part of application No. 10/239,670, filed on Jan. 22, 2003, now abandoned.

(51) Int. Cl.
*B24D 15/00* (2006.01)
(52) U.S. Cl. .............................. 283/91; 359/1; 359/621; 283/109; 428/42.1; 428/203; 428/913.3
(58) Field of Classification Search ................. 283/86, 283/91, 107–109, 72; 359/1–3, 8, 619, 621; 428/40.9, 42.1, 201, 203, 913.3
See application file for complete search history.

(56) References Cited

U.S. PATENT DOCUMENTS

| | | | | |
|---|---|---|---|---|
| 2,444,356 A | * | 6/1948 | Luce | 359/542 |
| 2,850,825 A | * | 9/1958 | Grants | 40/453 |
| 2,951,419 A | * | 9/1960 | Lemelson | 359/542 |
| 4,033,059 A | * | 7/1977 | Hutton et al. | 283/91 |
| 4,049,374 A | | 9/1977 | Rejto | |
| 4,238,190 A | | 12/1980 | Rejto | |
| 4,765,656 A | * | 8/1988 | Becker et al. | 283/70 |
| 4,913,504 A | | 4/1990 | Gallagher | |
| 4,932,685 A | * | 6/1990 | Mancuso | 283/91 |
| 4,999,075 A | | 3/1991 | Coburn, Jr. | |
| 5,106,126 A | | 4/1992 | Longobardi et al. | |
| 5,238,516 A | | 8/1993 | van Suylekom et al. | |
| 5,248,536 A | | 9/1993 | Du Katz | |
| 5,270,101 A | | 12/1993 | Helicher | |
| 5,456,967 A | | 10/1995 | Nezu | |
| 5,460,679 A | * | 10/1995 | Abdel-Kader | 156/275.5 |
| 5,461,495 A | * | 10/1995 | Steenblik et al. | 359/463 |

(Continued)

*Primary Examiner*—Daniel W. Howell
(74) *Attorney, Agent, or Firm*—Nicholas A Kees; Godfrey & Kahn, S.C.

(57) ABSTRACT

A reflective printed article includes a substrate having a top surface and a bottom surface with a graphic image printed thereon. A reflective or glossy ink layer is printed over the entire top surface of the substrate. A graphic image is printed over the reflective ink layer. The image may cover the entire portion of the reflective layer or only selected portions thereof. The graphic image includes hidden or latent images printed within the graphic image layers. An optional glossy layer of transparent ink may be printed over the graphic image. A textured pattern of lines is printed or applied in sections over the optional glossy layer or graphical image, with each line in the section printed at the same angle or orientation, with the lines of adjacent sections printed at different angles in order to reflect light in different directions to create the illusion of depth, three-dimensionality, hidden images and motion.

44 Claims, 30 Drawing Sheets

U.S. PATENT DOCUMENTS

| | | | |
|---|---|---|---|
| 5,468,540 A * | 11/1995 | Lu ............................. 428/156 |
| 5,492,370 A | 2/1996 | Chatwin et al. |
| 5,582,103 A * | 12/1996 | Tanaka et al. ................ 101/32 |
| 5,714,213 A * | 2/1998 | Antes et al. ................... 428/30 |
| 5,741,578 A | 4/1998 | Sax |
| 5,742,411 A | 4/1998 | Walters |
| 5,744,219 A | 4/1998 | Tahara |
| 5,753,344 A * | 5/1998 | Jacobsen .................... 428/142 |
| 5,762,379 A | 6/1998 | Salmon et al. |
| 5,804,285 A | 9/1998 | Kobayashi et al. |
| 5,851,032 A | 12/1998 | Green |
| 6,042,888 A | 3/2000 | Sismanis et al. |
| 6,084,713 A * | 7/2000 | Rosenthal ................... 359/619 |
| 6,113,149 A | 9/2000 | Dukatz |
| 6,132,822 A | 10/2000 | Overcash et al. |
| 6,139,210 A * | 10/2000 | Nelson et al. ................ 402/79 |
| 6,145,565 A | 11/2000 | Fromson et al. |
| 6,146,741 A * | 11/2000 | Ogawa et al. ............ 428/32.39 |
| 6,170,881 B1 * | 1/2001 | Salmon et al. ................. 283/91 |
| 6,176,521 B1 * | 1/2001 | Mancuso ...................... 283/91 |
| 6,180,228 B1 | 1/2001 | Mueller et al. |
| 6,181,446 B1 | 1/2001 | Cox et al. |
| 6,187,389 B1 | 2/2001 | Overcash et al. |
| 6,450,540 B1 * | 9/2002 | Kim ............................ 283/91 |
| 6,749,925 B2 * | 6/2004 | Hoppe et al. ................ 428/167 |
| 6,821,592 B2 * | 11/2004 | Rodick ....................... 428/40.1 |
| 6,833,960 B1 * | 12/2004 | Scarbrough et al. ......... 359/619 |
| 6,856,462 B1 * | 2/2005 | Scarbrough et al. ......... 359/619 |
| 6,905,755 B1 * | 6/2005 | Nemeth .................... 428/195.1 |
| 6,974,080 B1 * | 12/2005 | Goggins ................ 235/462.01 |
| 2004/0140665 A1 * | 7/2004 | Scarbrough et al. .......... 283/95 |

\* cited by examiner

REFLECTIVE ARTICLE AND METHOD OF MANUFACTURING SAME

CROSS-REFERENCE TO RELATED APPLICATION

This application is a continuation-in-part of U.S. application Ser. No. 10/239,670, filed on Jan. 22, 2003 now abandoned, incorporated herein by reference.

BACKGROUND OF THE INVENTION

The present invention relates generally to a printed article, and more particularly to a reflective printed article having a graphic design such as a trading card, greeting card, sign, poster, label, decal, book cover, decorative panel, name plate, visual display and the like having a reflective image with a textured pattern printed thereon creating visual illusions of depth, three-dimensionality, hidden images and motion in the printed article.

In order to attract the attention of consumers, many products are being manufactured with images that provide a unique and sensational visual presentation. To meet this demand, a variety of printing techniques have been developed to produce aesthetically pleasing visual effects, such as the appearance of depth, three-dimensionality and motion. Various methods are known in the prior art that produce three-dimensional images on two-dimensional media.

One method involves printing two offset images in different colors on an opaque or transparent sheet, and viewing the images using special glasses having right and left lenses which correspond to the different image colors respectively. Holographic technology can also be used to produce an image on a flat sheet which appears three-dimensional when illuminated and viewed at the proper angles.

However, these methods have not been commercially popular for various reasons. The offset image method is undesirable in that special glasses are required to view the image. Holographic images or holograms are difficult and expensive to produce. Therefore, processes have been developed to produce the illusion of three-dimensional images on two-dimensional media. One such process is conventional embossing, which forms a raised pattern on a substrate by physically deforming part of the substrate upwardly. However, embossing suffers from the drawback that an expensive press is necessary to perform the operation, and a die bearing the desired embossed pattern must be made for each application. Further, the materials that can be used for embossing are limited because of the deforming nature of the embossing process.

Therefore, a need exists for a printing method and printed article that offers the visual impact of embossing without the cost. The assignee of the present invention has developed a number of printing methods for printing a variety of visually stimulating images creating the illusion of depth and three-dimensionality as disclosed in U.S. Pat. Nos. 5,762,379; 6,113,149; and 6,170,881; the disclosures of which are incorporated herein by reference. The present invention provides an improved printing method for printing reflective images on a printed article having the illusion of depth, three-dimensionality, hidden images and motion.

SUMMARY OF THE INVENTION

Therefore, it is an object of the present invention to provide a printing method and printed article which overcomes the drawbacks of the prior art. It is another object of the present invention to provide a printing method for printing reflective images on a printed article creating the illusion of depth, three-dimensionality, hidden images and motion on the printed article. It is yet another object of the invention to provide a printing method for printing images on a printed article which change, appear, disappear, and/or move as the viewing angle of the printed article is changed.

The present invention includes a substrate having a top surface and a bottom surface. The substrate may be formed of any suitable type of printable material. In a preferred embodiment, a reflective or glossy ink is printed over the entire top surface of the substrate. Alternatively, a reflective foil or chrome may be deposited or laminated onto the top surface of the substrate. A graphic design or image is printed over the reflective layer. The image may cover the entire portion of the reflective layer or only selected portions thereof. The image may comprise a plurality of ink layers in order to provide the desired graphic design. The graphic design or image may also include hidden or latent images printed within the graphics. The graphic design or image may be applied through silk screening, lithography, flexography and other known printing techniques. An optional glossy layer of a clear coating or transparent ink may be printed over the image layer and the reflective layer. Printed on top of the optional glossy layer and/or image layer is a textured pattern or plurality of light bending textured lines of transparent ink oriented in various directions and angles to produce the desired brilliant visual effect of depth, three-dimensionality, hidden images and motion. This transparent ink has rheological properties such that when it is applied, a line of the ink flows into a semi-cylindrical or other convex shape when viewed in cross-section. These convex shaped lines produce a reflective textured pattern on the surface of the printed article. Other printing may be added over and/or around the image and textured lines as desired.

The textured pattern includes raised ridges for bending and reflecting light to create an iridescent visual effect and the visual illusion of depth, three-dimensionality, hidden latent images and motion through changes in color, tinting and reflectiveness. The textured pattern is created by a plurality of very thin lines spaced very close together at various angles and orientations to reflect light in various directions creating the illusion of movement as the printed article is viewed from different angles. The embossing method also allows for several variations to be produced. In another embodiment, a reflective or glossy ink may be printed over the entire top surface of the substrate. Alternatively, a reflective foil or chrome may be deposited or laminated onto the top surface of the substrate. A graphic design or image is printed over the reflective layer.

The textured pattern of lines are preferably printed in bands, rays or sections, with each line in the band, ray or section being printed at the same angle or orientation. The lines of adjacent bands, rays or sections are generally printed at a different angle or orientation in order to reflect light in a different direction to create the desired visual effect.

In another embodiment, the textured pattern is preferably formed by a clear plastic sheet that is laminated to the top or bottom surface of the substrate. The textured pattern of light manipulating lines is preferably created by impressing, embossing, or otherwise stamping the clear plastic laminate with a die or other embossing agent. The textured pattern of light controlling lines or lenses, having a semi-circular cross-section, may be formed in the clear plastic sheet before or after it is laminated to the printed article. An advantage of using a laminate instead of an ink, is that the light controlling lines may be spaced closer together.

Various other features, objects, and advantages of the invention will be made apparent to those skilled in the art from the accompanying drawings and detailed description thereof.

DETAILED DESCRIPTION OF THE INVENTION

Figure 1:
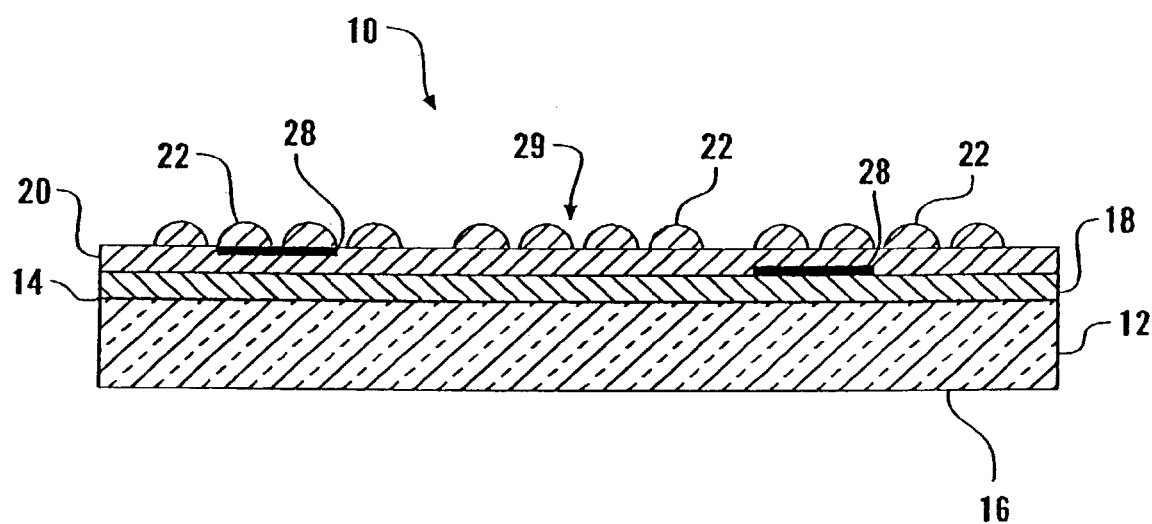
FIG. 1 is an enlarged cross-sectional view of one embodiment of a printed article produced in accordance with the present invention.

Referring now to the drawings, FIG. 1 illustrates a cross sectional view of a first embodiment of a printed article produced in accordance with the present invention, depicted on a much enlarged basis over actual size. The printed article 10 includes a substrate 12 having a top surface 14 and a bottom surface 16. The substrate 12 can be formed of paper, cardboard, plastic, acrylic, glass, metal or any other suitable printable material.

A reflective ink layer 18 is printed over all or a portion of the top surface 14 of the substrate 12. The reflective layer 18 is preferably formed of reflective ink which is printed onto the substrate 12. The reflective layer 18 can be clear or have any color. The reflective layer 18 can be opaque, transparent, semi-transparent or translucent. The reflective layer 18 gives the printed article a shiny or glossy metallic appearance. Alternatively, the reflective layer 18 can be formed of a chrome film, diffraction film, metallic foil, holographic foil, roll leafing, or any metalized material having a shiny surface.

Figure 14:
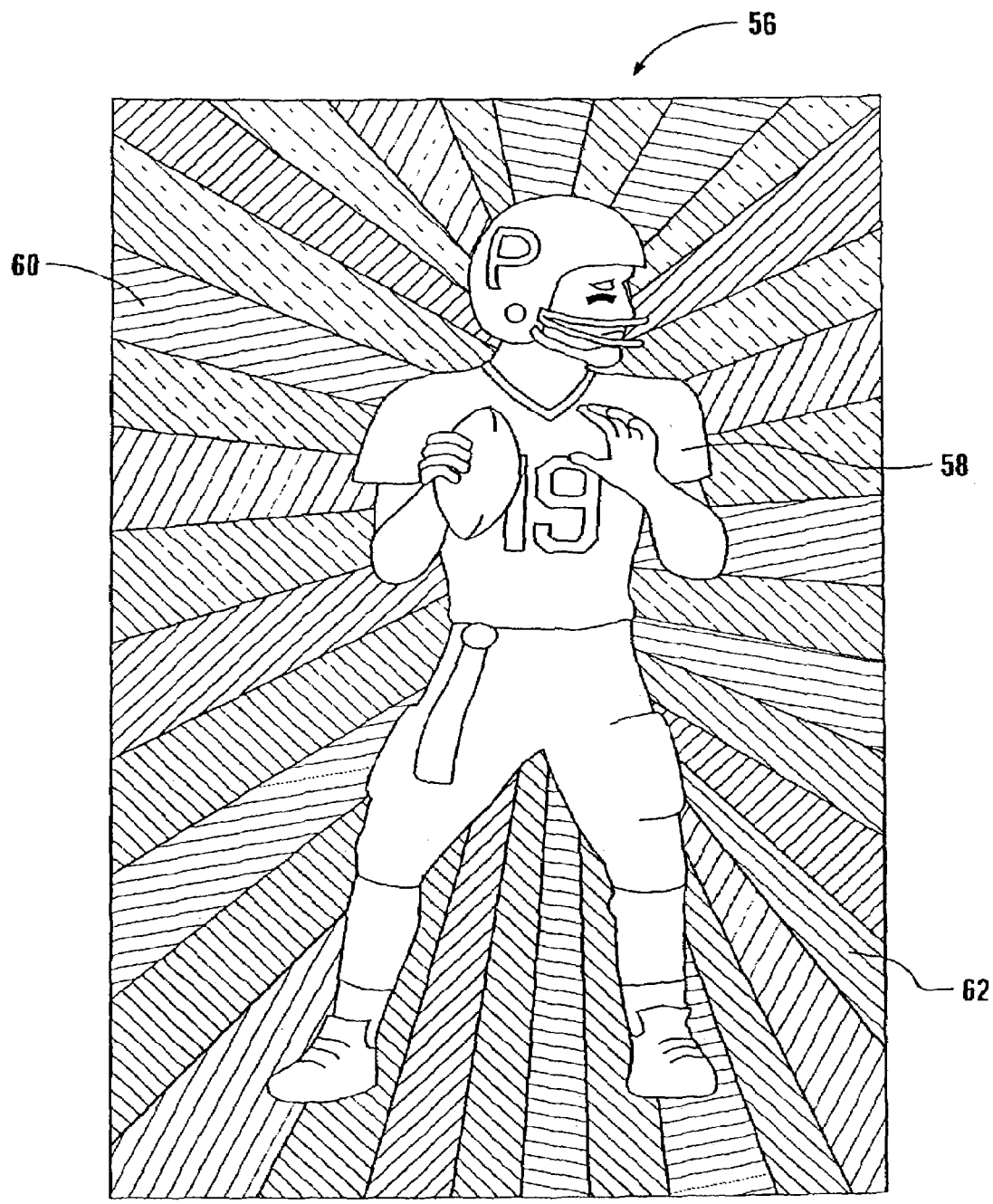
FIG. 14 is a top plan view of a trading card having an image printed thereon in accordance with the present invention.

A graphic design or image 20 is printed over all or a portion of the reflective layer 18. The image 20 can have any desired form, for example, a football player on a sports trading card as shown in FIG. 14, or any other image. The graphic design or image 20 may comprise a plurality of ink layers in order to provide the desired design. The graphic design 20 may also include hidden or latent images 28 printed within the design. These hidden or latent images 28 are "weak" or "lightly" printed images that are printed among the plurality of ink layers of the graphic design, and are visible only at certain viewing angles. The hidden images 28 appear and disappear from a viewer as the viewing angle of the printed article is changed.

A preferred method of forming the graphic design 20 and hidden images 28 is through a four-color offset printing process where a base layer is printed and a four-color image is printed over the base layer. The graphic design 20 and hidden images 28 may be printed with opaque ink, semi-transparent ink, translucent ink, or any combination thereof. These inks are preferably curable in response to ultraviolet (UV) light. Other methods of forming the graphic design 20 and hidden images 28 images include silk screening, lithography, flexography, gravure or other known printing methods.

A textured pattern 29 is printed over and/or around the graphic design or image 20. The textured pattern includes a plurality of parallel convex rounded ridges or lines 22 of transparent ink printed in bands, rays or sections 60, FIG. 14, over and/or around the graphic design or image 20. The textured pattern 29 is created by a plurality of very thin lines 22 spaced very closely together at various angles and orientations to reflect light in various directions. In the preferred embodiment, the height and thickness of the lines is approximately 0.2 mils to 0.5 mils. However, the thickness, height and spacing of the lines may vary depending upon the particular application and desired visual effect. The textured pattern 29 can be formed over the entire surface of the image 20 or over only a portion thereof. The textured pattern 29 of lines 22 is preferably formed from a transparent ink, such as Nasdar 3527 or the like, printed on top of the graphic design or image 20 by a printing method such as silk screening, lithography, flexography, offset printing, gravure, coating or other known printing method. The transparent ink has rheological properties such that when it is applied, it flows into a semi-cylindrical or other convex shape when viewed in cross-section. This transparent ink is also preferably a UV curable ink. The transparent ink may also include flakes of glitter, or pearls, or other materials to produce a "glittery" effect on the printed article.

The textured pattern 29 gives the appearance of a raised or embossed effect, which simulates depth and three-dimensionality. The semi-cylindrically shaped raised ridges or lines 22 bend and reflect light incident on the printed article 10 producing the visual illusion of depth, three-dimensionality, hidden images and motion through hue and color changes in the printed article as it is viewed from different angles. Light incident on the printed article 10 is reflected off the reflective layer 18 back through the graphic design or image 20 and the textured pattern 29 to create a unique visual effect. As mentioned previously, the textured pattern 29 includes a plurality of parallel lines 22 printed in bands, rays or sections 60 over the image 20. The parallel lines 22 in each section 60 are all oriented in the same direction to illuminate the entire section of printed lines when light is reflected from the reflective layer 18 through the textured pattern of lines. Adjacent sections 60 have parallel lines 22 oriented in different directions to reflect light in different directions as the printed article 10 is viewed from different angles. These different sections 60 of textured patterns of lines create the illusion of depth, three-dimensionality, appearing and disappearing images, and motion in the printed article 10 as it is viewed from different angles.

Figure 1A:
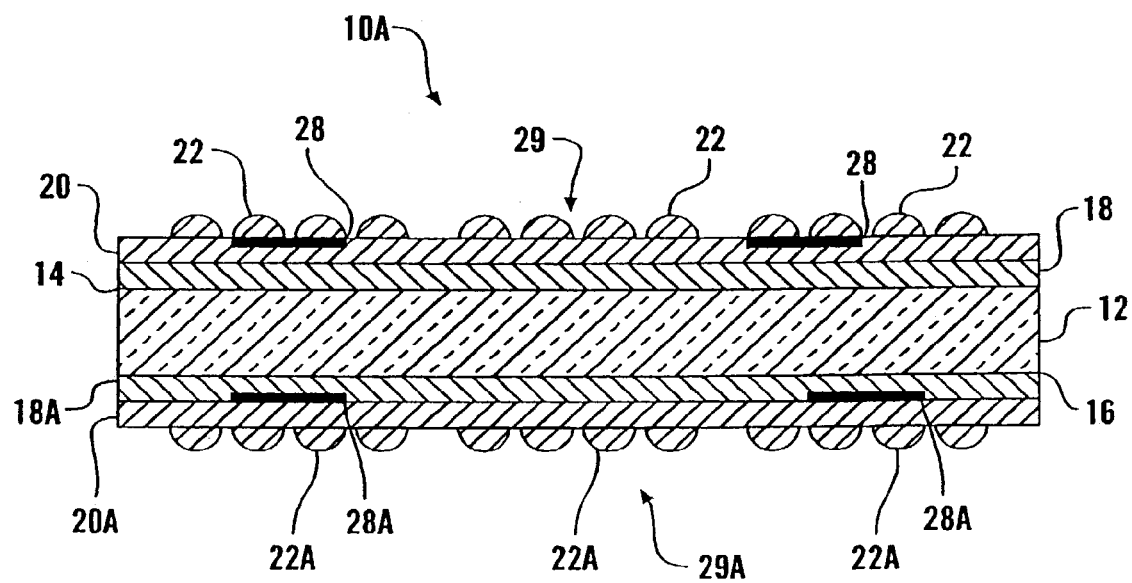
FIG. 1A is an enlarged cross-sectional view of the printed article in FIG. 1 with printing on both the top and bottom surfaces of the printed article.

FIG. 1A illustrates the printed article 10 of FIG. 1 with printing on both the top 14 and bottom 16 surfaces of the substrate 12. The printed article 10A of FIG. 1A includes a second reflective layer 18A printed on the bottom surface 16 of the substrate 12, a second graphic design or image 20A printed over and/or around the second reflective layer 18A, and a second textured pattern 29A of lines 22A printed on the second graphic design or image 20A. The graphic design or image 20A may also include hidden or latent images 28A "lightly" printed within the design.

Figure 2:
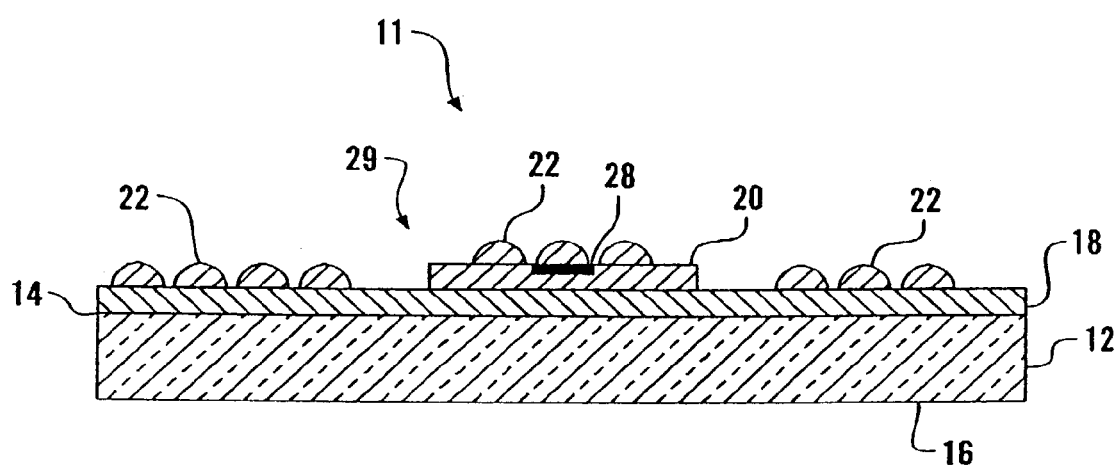
FIG. 2 is an enlarged cross-sectional view illustrating a modification of the embodiment shown in FIG. 1.
Figure 2A:
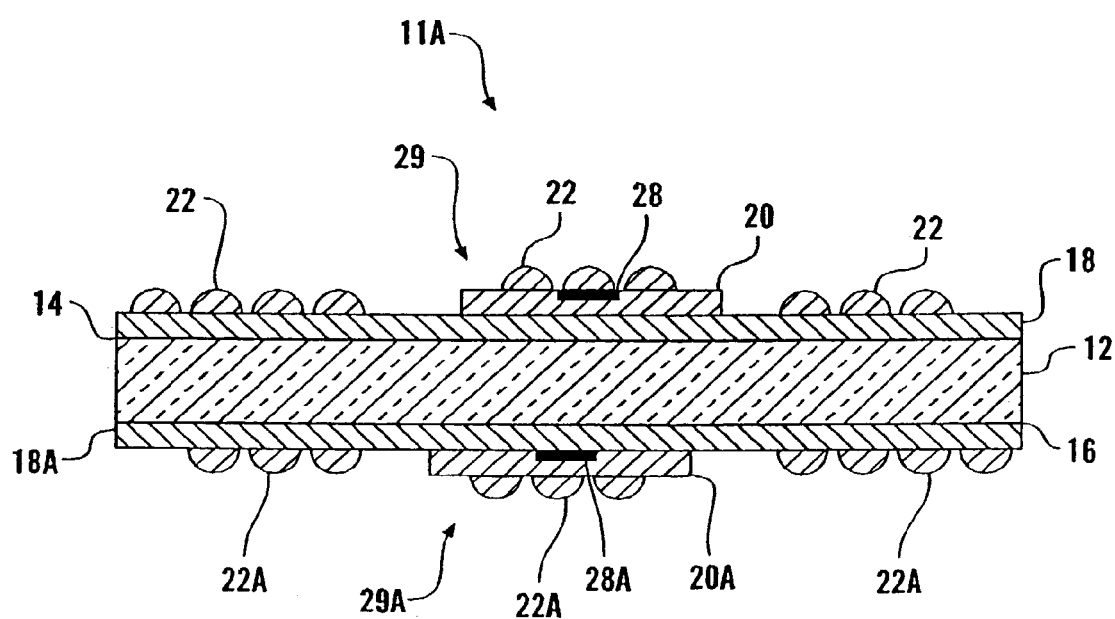
FIG. 2A is an enlarged cross-sectional view of the printed article in FIG. 2 with printing on both the top and bottom surfaces of the printed article.
Figure 3:
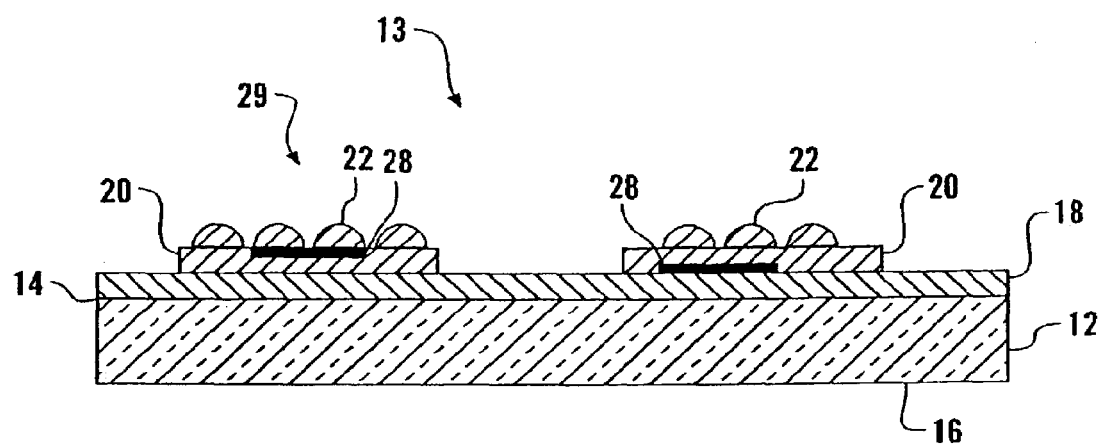
FIG. 3 is an enlarged cross-sectional view illustrating another modification of the embodiment shown in FIG. 1.
Figure 3A:
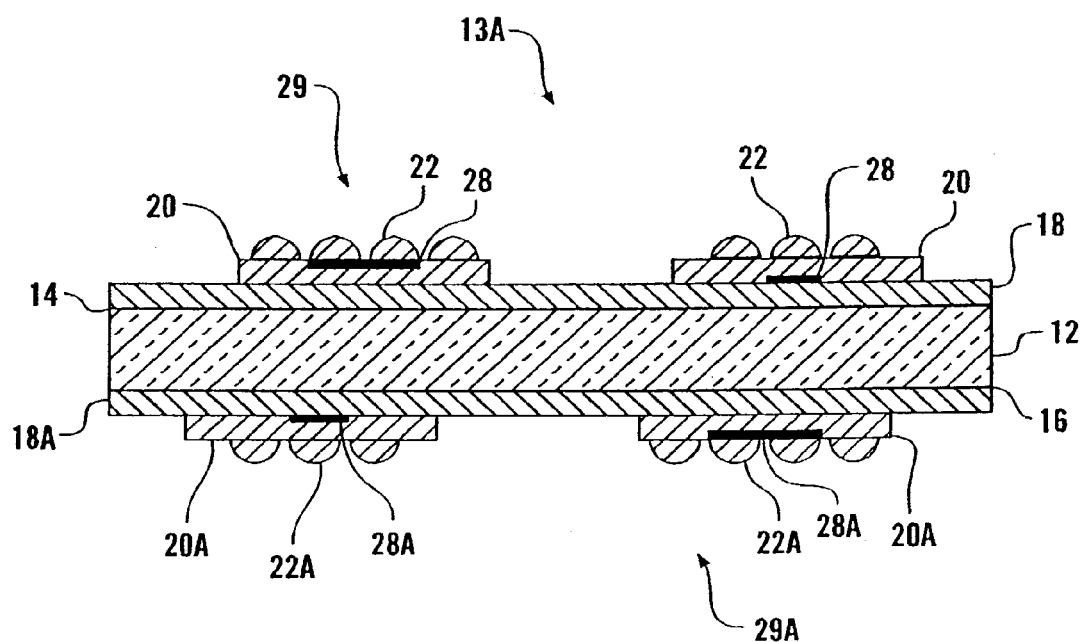
FIG. 3A is an enlarged cross-sectional view of the printed article in FIG. 3 with printing on both the top and bottom surfaces of the printed article.
Figure 4:
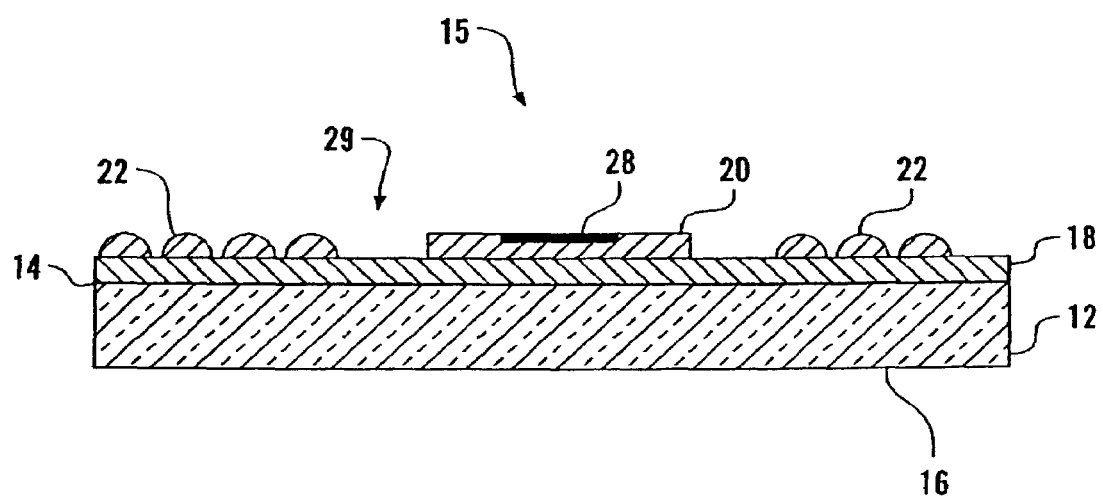
FIG. 4 is an enlarged cross-sectional view illustrating yet another modification of the embodiment shown in FIG. 1.
Figure 4A:
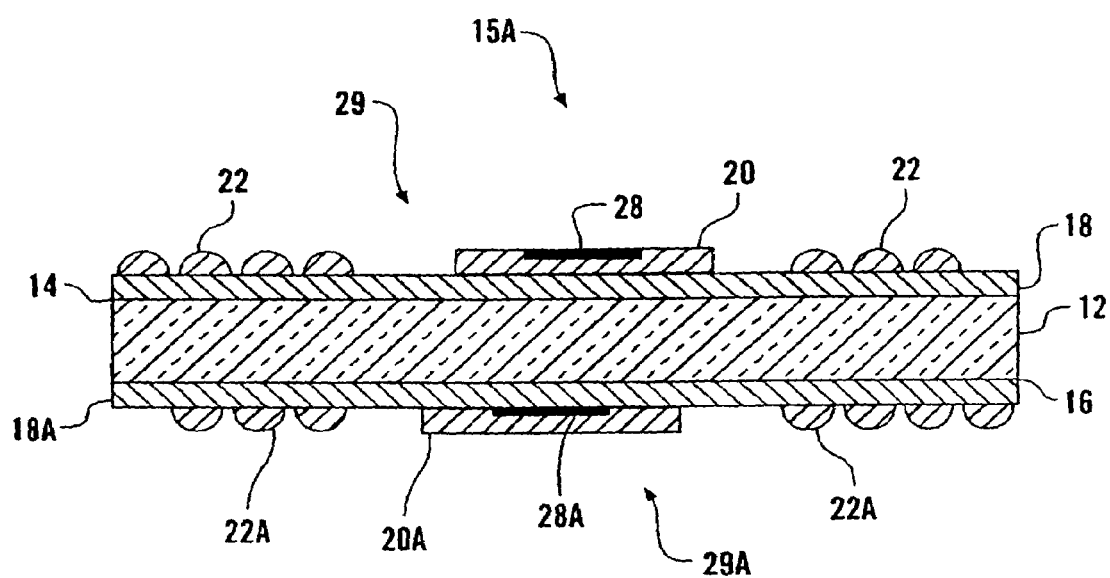
FIG. 4A is an enlarged cross-sectional view of the printed article in FIG. 4 with printing on both the top and bottom surfaces of the printed article.

FIGS. 2, 2A, 3, 3A, 4 and 4A show variations or modifications 11, 11A, 13, 13A, 15 and 15A of the first embodiment, as shown in FIGS. 1 and 1A. In FIGS. 2 and 2A, variations 11 and 11A include a graphic design or image 20, 20A printed on selected portions of a reflective layer 18, 18A with a textured pattern 29, 29A of lines 22, 22A printed on both the reflective layer 18, 18A and graphic image 20, 20A. In FIGS. 3 and 3A, variations 13 and 13A include a graphic design or image 20, 20A printed on selected portions of a reflective layer 18, 18A with a textured pattern 29, 29A of lines 22, 22A printed only on the graphic image 20, 20A. In FIGS. 4 and 4A, variations 15 and 15A include a graphic design or image 20, 20A printed on selected portions of a reflective layer 18, 18A with a textured pattern 29, 29A of lines 22, 22A printed only on the reflective layer 18, 18A. The graphic design or image layers 20, 20A may also include hidden or latent images 28, 28A "lightly" printed within the design.

Figure 5:
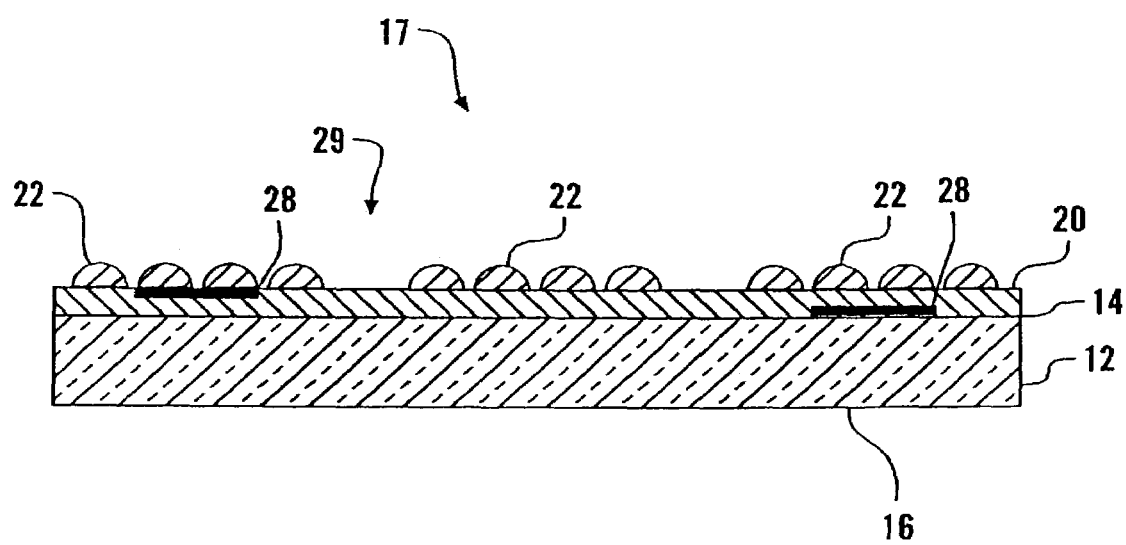
FIG. 5 is an enlarged cross-sectional view of a second embodiment of a printed article produced in accordance with the present invention.

FIG. 5 illustrates an enlarged cross sectional view of a second embodiment of a printed article 17 produced in accordance with the present invention. The difference between this embodiment and the first embodiment is that this embodiment does not include a reflective layer printed on the surface of the substrate. Instead, a graphic design or image is printed directly on the surface of the substrate.

The printed article 17 includes a substrate 12 having a top surface 14 and a bottom surface 16. The substrate 12 may be formed of any suitable printable material. It is preferred that the top 14 and bottom 16 surfaces of the substrate 12 are substantially reflective or glossy.

A graphic design or image 20 is printed over all or a portion of the top surface 14 of the substrate 12. The graphic design or image 20 may comprise a plurality of ink layers having hidden or latent images 28 printed among the plurality of ink layers. These hidden or latent images 28 are "weak" or "lightly" printed images that are visible only at certain viewing angles. The graphic design 20 and hidden images 28 may be printed with opaque ink, semi-transparent ink, translucent ink, or any combination thereof. The inks used are preferably UV curable inks.

A textured pattern 29 is printed over and/or around the graphic design or image 20. The textured pattern 29 includes a plurality of parallel convex rounded ridges or lines 22 of transparent ink printed in bands, rays or sections over and/or around the graphic design or image 20. In the preferred embodiment, the height and thickness of the lines is approximately 0.2 mils to 0.5 mils. However, the thickness, height and spacing of the lines may vary depending upon the particular application and desired visual effect. The textured pattern 29 can be formed over the entire surface of the image 20 or over only a portion thereof. The textured pattern 29 of lines 22 is preferably formed from a transparent ink, such as Nasdar 3527 or the like, printed on top of the graphic design or image 20 by a printing method such as silk screening, lithography, flexography, offset printing, gravure, coating or other known printing method. The transparent ink has theological properties such that when it is applied, it flows into a semi-cylindrical or convex shape when viewed in cross-section. This transparent ink is also preferably a UV curable ink. The textured pattern 29 of lines 22 create the illusion of depth, three-dimensionality, appearing and disappearing images, and motion in the printed article 17 as it is viewed from different angles.

Figure 5A:
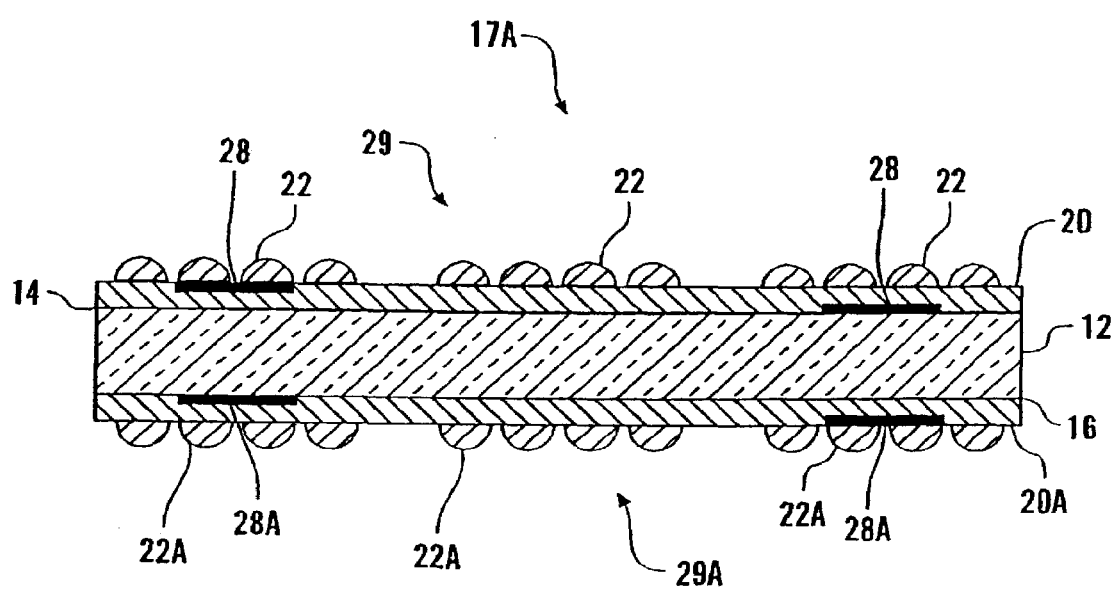
FIG. 5A is an enlarged cross-sectional view of the printed article in FIG. 5 with printing on both the top and bottom surfaces of the printed article.

FIG. 5A shows a printed article 17A similar to the printed article 17 of FIG. 5 with printing on both the top 14 and bottom 16 surfaces of the substrate 12. The printed article 17A includes a second graphic design or image 20A printed on the bottom surface 16 of the substrate 12 and a second textured pattern 29A of convex-shaped lines 22A printed on the second graphic design or image 20A. The graphic design or image 20A may also include hidden or latent images 28A "lightly" printed within the design.

Figure 6:
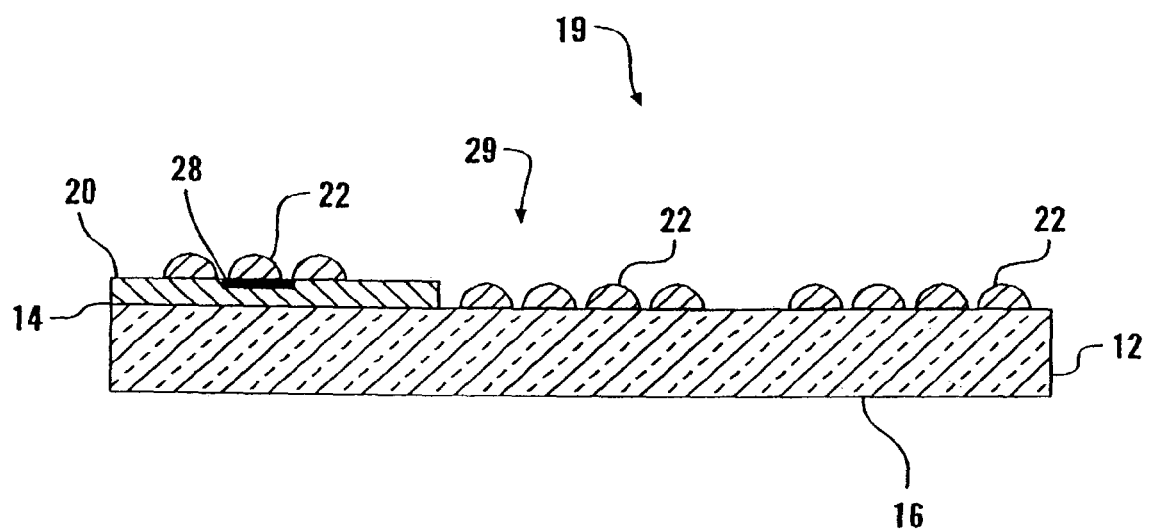
FIG. 6 is an enlarged cross-sectional view illustrating a modification of the embodiment shown in FIG. 5.
Figure 6A:
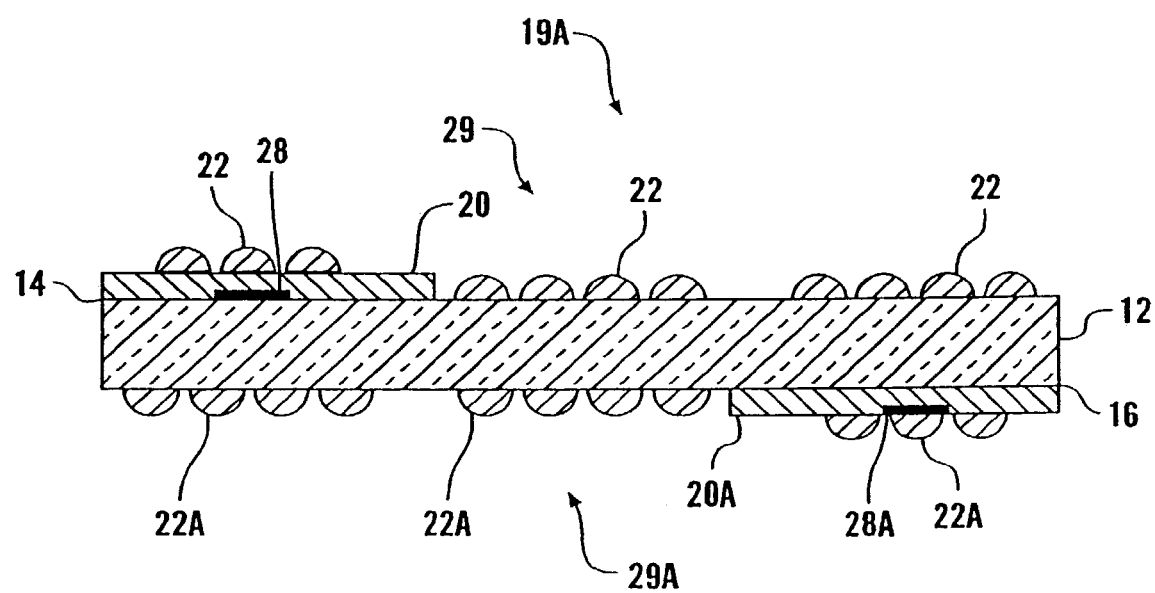
FIG. 6A is an enlarged cross-sectional view of the printed article in FIG. 6 with printing on both the top and bottom surfaces of the printed article.
Figure 7:
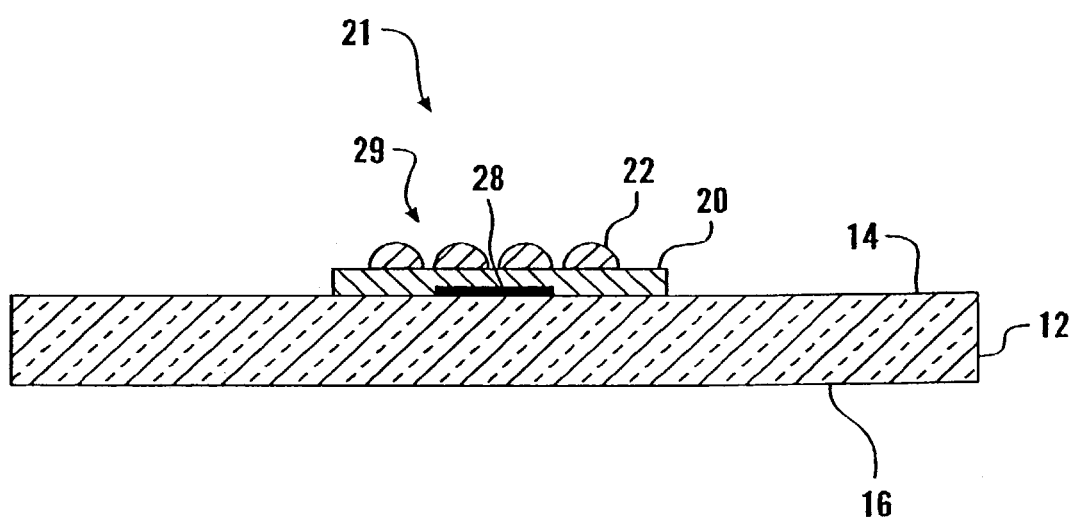
FIG. 7 is an enlarged cross-sectional view illustrating another modification of the embodiment shown in FIG. 5.
Figure 7A:
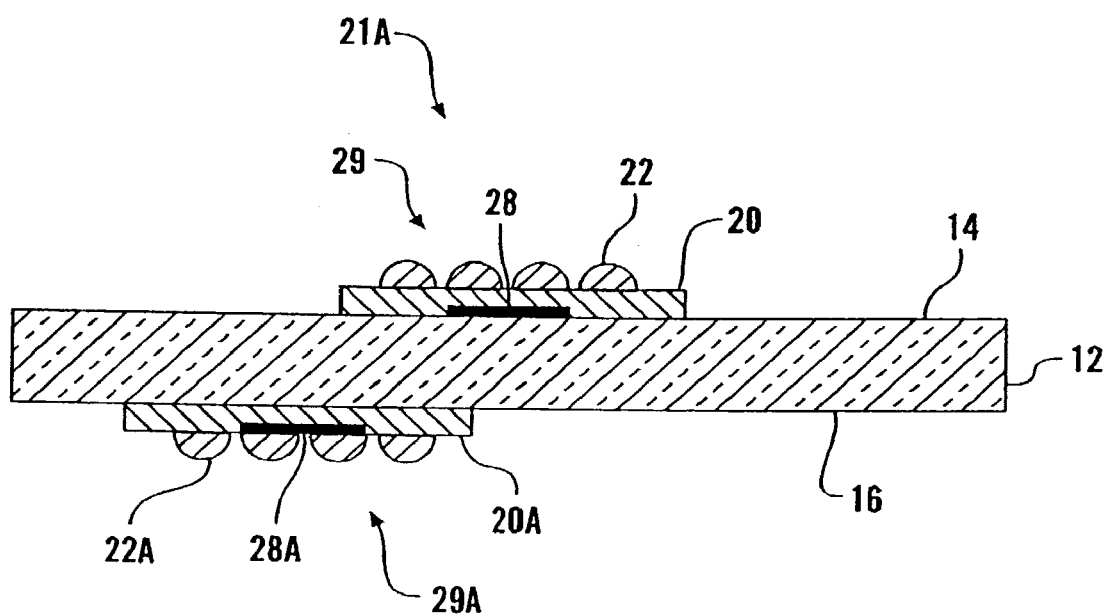
FIG. 7A is an enlarged cross-sectional view of the printed article in FIG. 7 with printing on both the top and bottom surfaces of the printed article.
Figure 8:
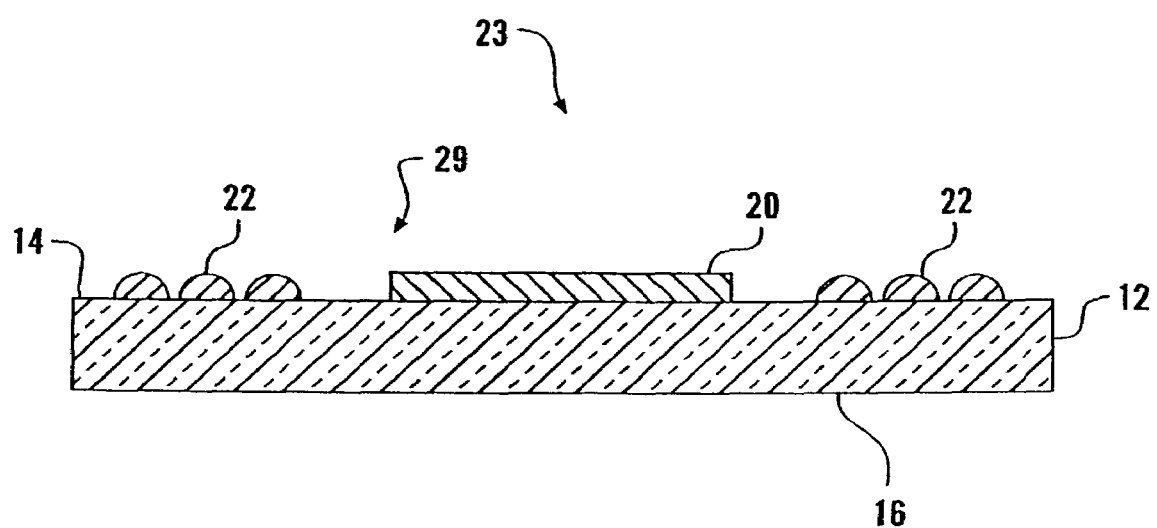
FIG. 8 is an enlarged cross-sectional view illustrating yet another modification of the embodiment shown in FIG. 5.
Figure 8A:
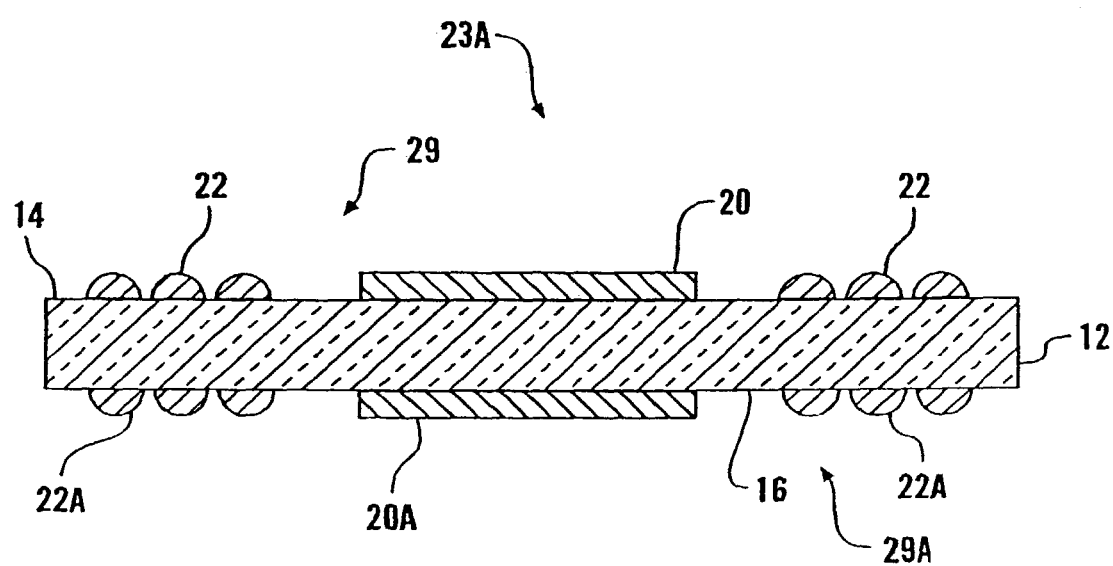
FIG. 8A is an enlarged cross-sectional view of the printed article in FIG. 8 with printing on both the top and bottom surfaces of the printed article.

FIGS. 6, 6A, 7, 7A, 8 and 8A show variations or modifications 19, 19A, 21, 21A, 23 and 23A of the second embodiment of FIGS. 5 and 5A. In FIGS. 6 and 6A, variations 19 and 19A include a graphic design or image 20, 20A printed on selected portions of the top 14 and bottom 16 surfaces of the substrate 12 with the textured pattern 29, 29A of lines 22, 22A printed on both the top 14 and bottom 16 surfaces of the substrate 12 and image 20, 20A. In FIGS. 7 and 7A, variations 21 and 21A include a graphic design or image 20, 20A printed on selected portions of the top 14 and bottom 16 surfaces of the substrate 12 with the textured pattern 29, 29A of lines 22, 22A printed only on the image 20, 20A. In FIGS. 8 and 8A, variations 23 and 23A include a graphic design or image 20, 20A printed on selected portions of the top 14 and bottom 16 surfaces of the substrate 12 and the textured pattern 29, 29A of lines 22, 22A printed only on the top 14 and bottom 16 surfaces of the substrate 12. The graphic design or image 20, 20A may also include hidden or latent images 28, 28A "lightly" printed within the design.

Figure 9:
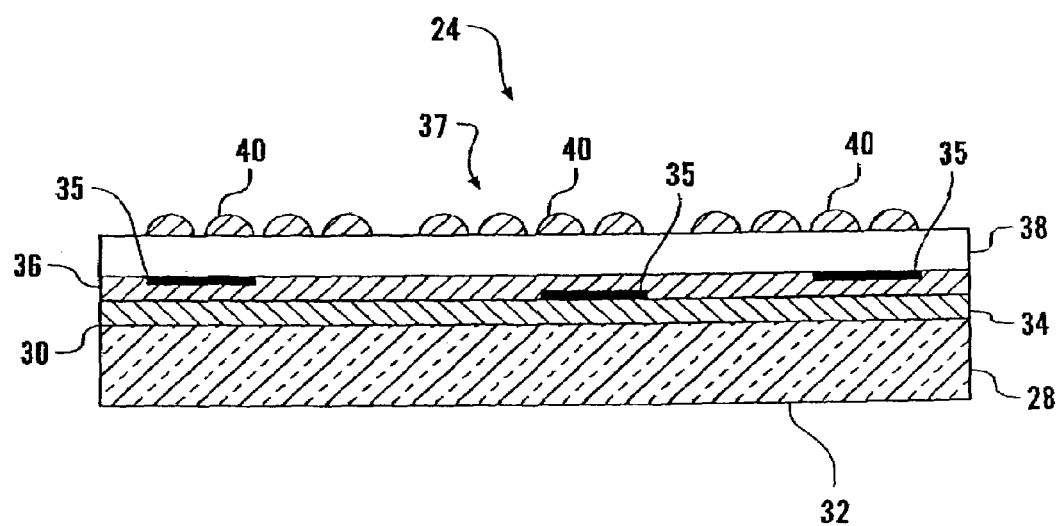
FIG. 9 is an enlarged cross-sectional view of a third embodiment of a printed article produced in accordance with the present invention.

FIG. 9 illustrates an enlarged cross sectional view of a third embodiment of a printed article 24 produced in accordance with the present invention. The difference between this embodiment and the first embodiment is that this embodiment includes a transparent glossy layer printed between the graphic image and the textured pattern.

The printed article 24 includes a substrate 28 having a top surface 30 and a bottom surface 32. A reflective ink layer 34 is printed over all or a portion of the top surface 30 of the substrate 28. The reflective layer 34 is preferably formed of reflective ink which is printed on the substrate 28. The reflective ink can be opaque, transparent, semi-transparent or translucent to give the printed article 24 a shiny or glossy metallic appearance.

A graphic design or image 36 is printed over all or a portion of the reflective layer 34. The graphic design or image 36 comprises a plurality of ink layers that may include hidden or latent images 35 printed within the design. These hidden or latent images 35 are "weak" or "lightly" printed images that may be visible only at certain viewing angles. The graphic design 36 and hidden images 35 may be printed with opaque ink, semi-transparent ink, translucent ink, or any combination thereof. The inks used are preferably UV curable inks.

A transparent glossy layer 38 is printed over the image 36 and any exposed portion of the reflective layer 34. The transparent glossy layer 38 may be formed of clear polyester by thermal lamination, or by printing or coating with a clear plastic or transparent ink. The glossy layer 38 can also be formed of a pressure sensitive sheet using cold lamination.

A textured pattern 37 is printed on top of the glossy layer 38. The textured pattern 37 includes a plurality of parallel convex ridges or lines 40 of transparent ink printed in bands, rays or sections over the glossy layer 38. In the preferred embodiment, the height and thickness of the lines is approximately 0.2 mils to 0.5 mils. However, the thickness, height and spacing of the lines may vary depending upon the particular application and desired visual effect. The textured pattern 37 can be formed over the entire surface of the glossy layer 38 or over only a portion thereof. The textured pattern 37 of lines 40 is preferably formed from a transparent ink, such as Nasdar 3527 or the like, printed on the glossy layer 38 by a printing method such as silk screening, lithography, flexography, offset printing, gravure, coating or other known printing method. The transparent ink has rheological properties such that when it is applied, it flows into a semi-cylindrical or other convex shape when viewed in cross-section. This transparent ink is also preferably a UV curable ink. The textured pattern 37 of lines 40 create the illusion of depth, three-dimensionality, appearing and disappearing images, and motion in the printed article 24 as it is viewed from different angles.

Figure 9A:
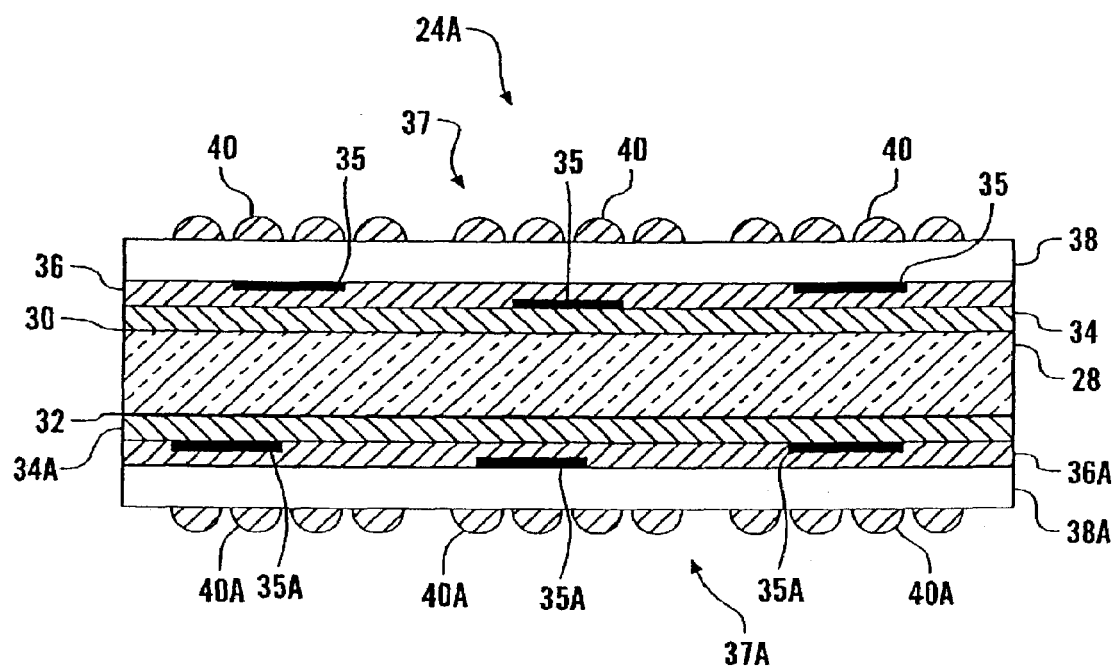
FIG. 9A is an enlarged cross-sectional view of the printed article in FIG. 9 with printing on both the top and bottom surfaces of the printed article.

FIG. 9A illustrates a printed article 24A similar to the printed article 24 of FIG. 9 with printing on both the top 30 and bottom 32 surfaces of the substrate 28. The printed article 24A includes a second reflective layer 34A printed on the bottom surface 32 of the substrate 28, a second graphic design or image 36A printed on the second reflective layer 34A, a second transparent glossy layer 38A printed on the image 36A and a second textured pattern 37A of lines 40A printed on the second transparent glossy layer 38A. The graphic design or image 36A may also include hidden or latent images 35A "lightly" printed within the design.

Figure 10:
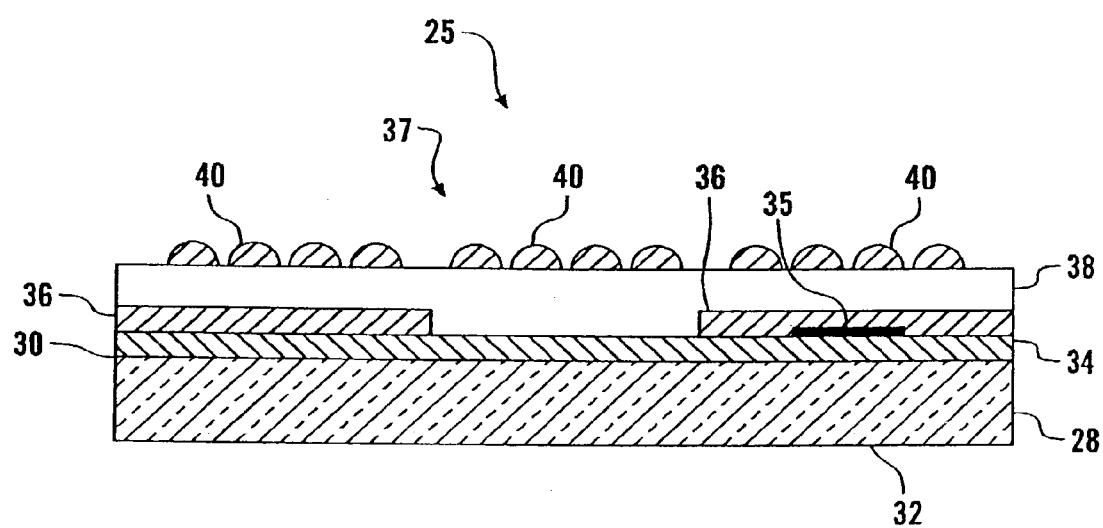
FIG. 10 is an enlarged cross-sectional view illustrating a modification of the embodiment shown in FIG. 9.
Figure 10A:
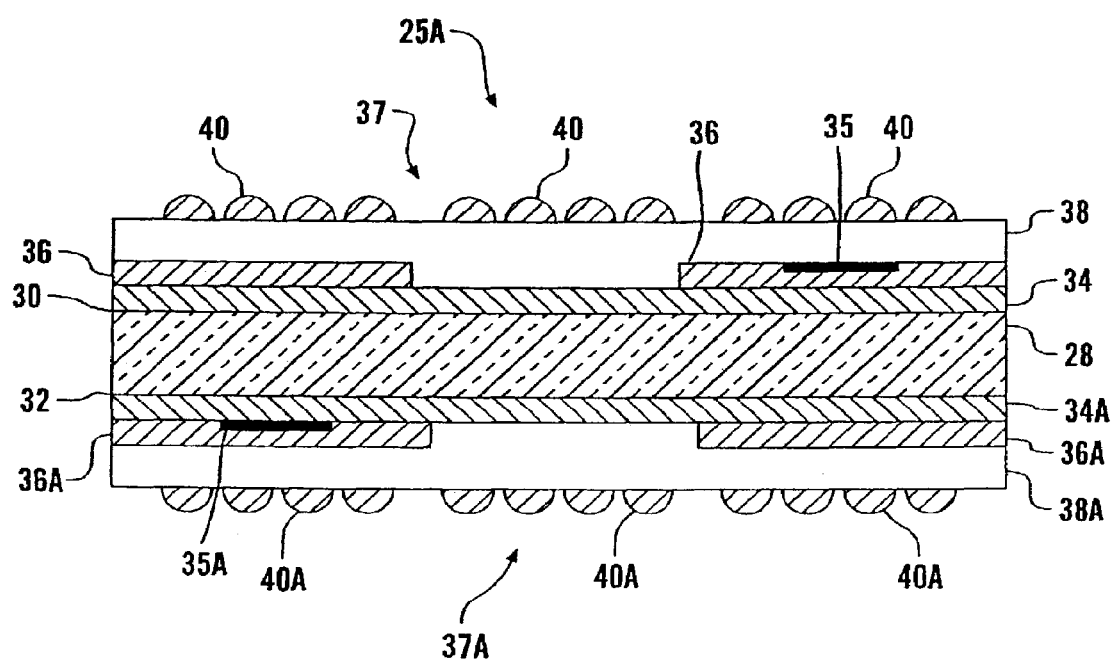
FIG. 10A is an enlarged cross-sectional view of the printed article in FIG. 10 with printing on both the top and bottom surfaces of the printed article.
Figure 11:
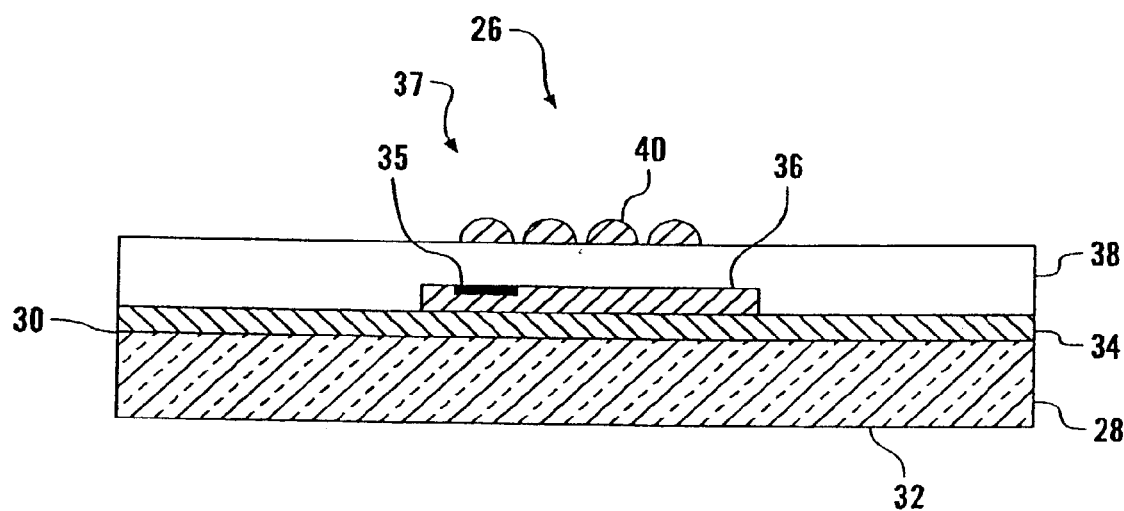
FIG. 11 is an enlarged cross-sectional view illustrating another modification of the embodiment shown FIG. 9.
Figure 11A:
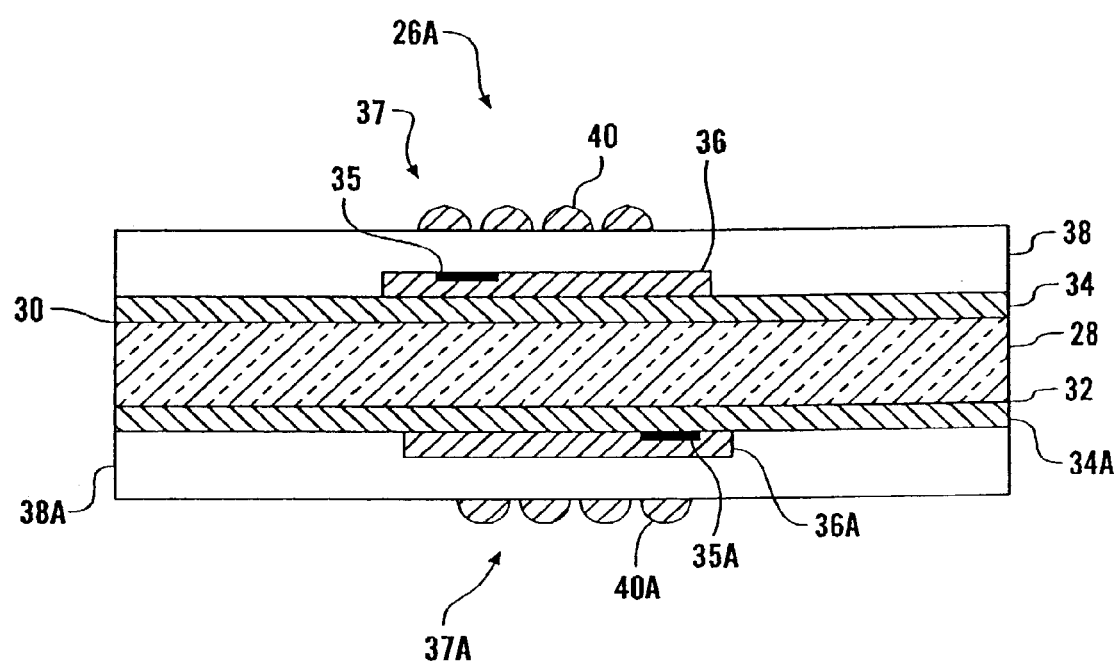
FIG. 11A is an enlarged cross-sectional view of the printed article in FIG. 11 with printing on both the top and bottom surfaces of the printed article.
Figure 12:
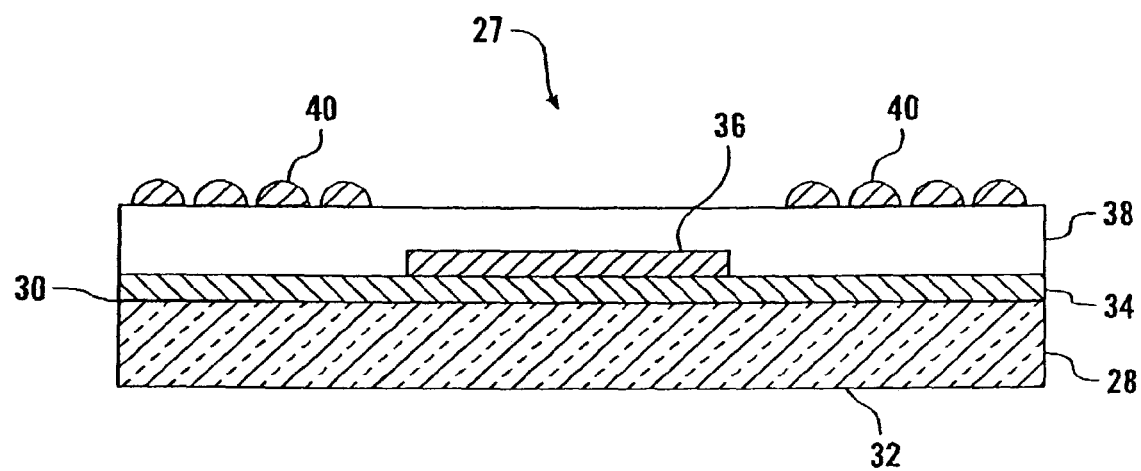
FIG. 12 is an enlarged cross-sectional view illustrating yet another modification of the embodiment shown in FIG. 9.
Figure 12A:
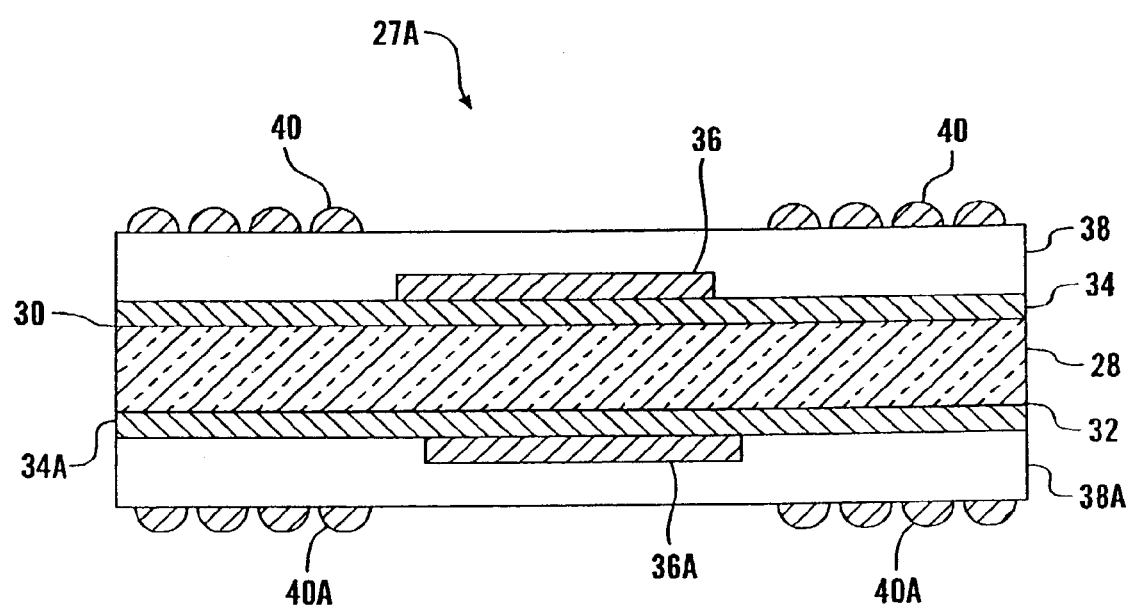
FIG. 12A is an enlarged cross-sectional view of the printed article in FIG. 12 with printing on both the top and bottom surfaces of the printed article.

FIGS. 10, 10A, 11, 11A, 12 and 12A show variations or modifications 25, 25A, 26, 26A, 27 and 27A of the third embodiment, as shown in FIGS. 9 and 9A. In FIGS. 10 and 10A, variations 25 and 25A include a graphic design or image 36, 36A printed on selected portions of a reflective layer 34, 34A with a textured pattern 37, 37A of lines 40, 40A printed on a transparent glossy layer 38, 38A over both the reflective layer 34, 34A and image 36, 36A. In FIGS. 11 and 11A, variations 26 and 26A include a graphic design or image 36, 36A printed on selected portions of a reflective layer 34, 34A with a textured pattern 37, 37A of lines 40, 40A printed on a transparent glossy layer 38, 38A only over the image 36, 36A. In FIGS. 12 and 12A, variations 27 and 27A include a graphic design or image 36, 36A printed on selected portions of a reflective layer 34, 34A with a textured pattern 37, 37A of lines 40, 40A printed on a transparent glossy layer 38, 38A over only the reflective layer 34, 34A. The graphic design or image 36, 36A may also include hidden or latent images 35, 35A "lightly" printed within the design.

Figure 13:
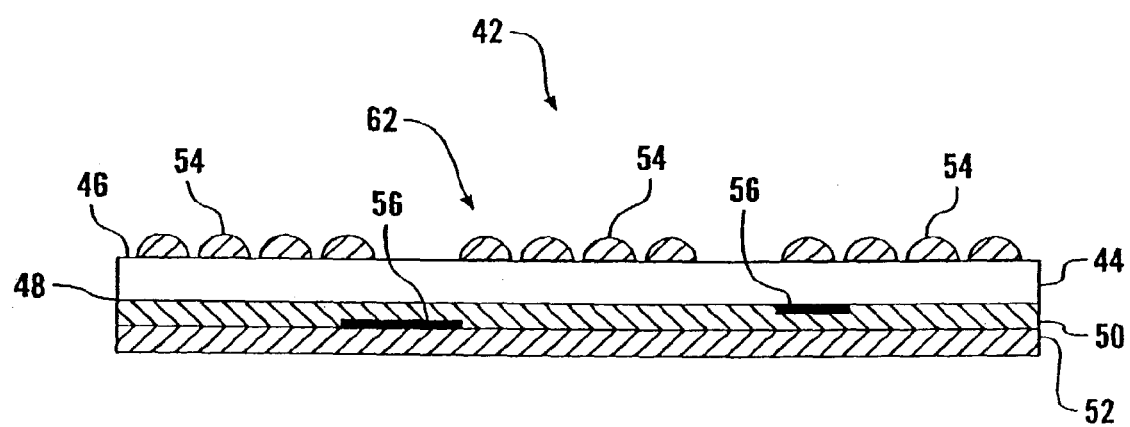
FIG. 13 is an enlarged cross-sectional view of a fourth embodiment of a printed article produced in accordance with the present invention.

FIG. 13 illustrates an enlarged cross sectional view of a fourth embodiment of a printed article 42 produced in accordance with the present invention. The printed article 42 includes a clear or transparent substrate 44 having a top surface 46 and a bottom surface 48. A graphic design or image 50 is printed over all or a portion of the bottom surface 48 of the substrate 44. The graphic design or image 50 comprises a plurality of ink layers that may include hidden or latent images 56 printed within the design. These hidden or latent images 56 are "weak" or "lightly" printed images that may be visible only at certain viewing angles. The graphic design 50 and hidden images 56 may be printed with opaque ink, semi-transparent ink, translucent ink, or any combination thereof. The inks used are preferably UV curable inks. A reflective layer 52 is printed over all or a portion of the graphic image 50 on the bottom surface 48 of the substrate 44. The reflective layer 52 is preferably formed of reflective ink which can be opaque, transparent, semi-transparent or translucent to give the printed article 42 a shiny or glossy metallic appearance.

A textured pattern 62 is printed on the top surface 46 of the substrate 44. The textured pattern 62 includes a plurality of parallel convex ridges or lines 54 of opaque, semi-transparent, or translucent ink printed in bands, rays or sections on the top surface 46 of the substrate 44. In the preferred embodiment, the height and thickness of the lines is approximately 0.2 mils to 0.5 mils. However, the thickness, height and spacing of the lines may vary depending upon the particular application and desired visual effect. The textured pattern 62 can be formed over the entire top surface 46 of the substrate 44 or over only a portion thereof. The textured pattern 62 of lines 54 is preferably formed from an opaque, semi-transparent, or translucent ink, such as Flint RVW29129 or the like, printed on top of the substrate by processes such as silk screening, lithography, flexography, offset printing, gravure, coating or other known printing method. The ink has rheological properties such that when it is applied, it flows into a semi-cylindrical or other convex shape when viewed in cross-section. This ink is also preferably a UV curable ink. The textured pattern 62 of lines 54 create the illusion of depth, three-dimensionality, appearing and disappearing images, and motion in the printed article 42.

FIG. 14 illustrates an example, a sports trading card 56 manufactured in accordance with the present invention. The card 56 includes the image of a football player 58 printed over a reflective layer covering the entire top surface of the card. Printed around the image 58 is a plurality of textured lines 60 printed within a plurality of sections or rays 62 emanating from the image 58. The textured lines 60 are produced by transparent ink printed within the sections or rays 62. Each of the sections 62 includes a plurality of parallel lines 60 all oriented in the same direction to illuminate the entire section 62 when light is reflected from the reflective layer through the textured pattern of lines 60 when the card 56 is viewed at different angles. Adjacent sections 62 have lines 60 oriented in different directions to reflect the light in different directions as the card 56 is viewed from different angles. The invention also contemplates sections 62 not having a textured pattern of lines 60, but a layer of translucent ink covering the reflective layer creating a flat appearance. The different sections 62 of textured patterns of lines 60 creates the illusion of depth, three-dimensionality, appearing and disappearing images, and motion in the printed sports trading card 56.

Figure 15:
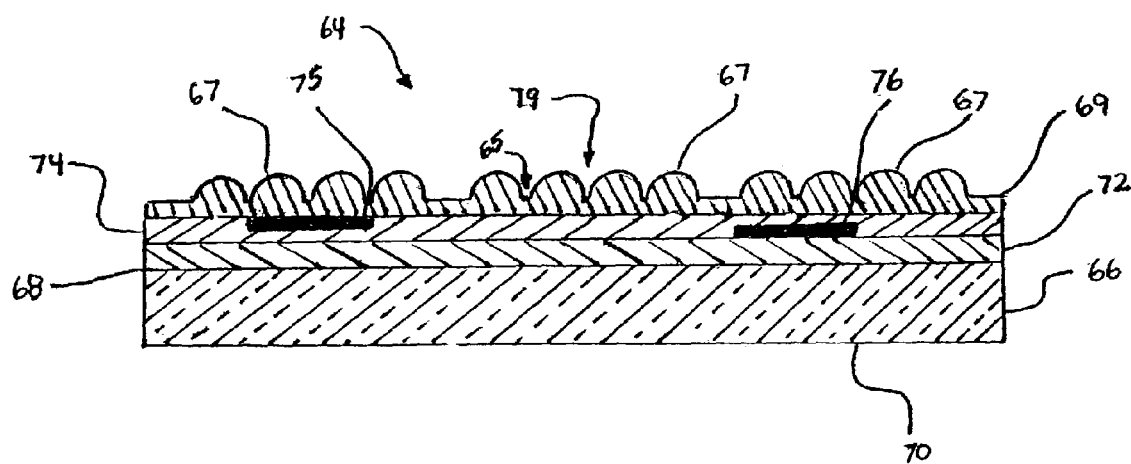
FIG. 15 is an enlarged cross-sectional view of a fifth embodiment of a printed article produced in accordance with the present invention.

FIG. 15 illustrates an enlarged cross-sectional view of an embodiment of a printed article, similar to the embodiment shown in FIG. 1. The printed article 64 preferably includes a substrate 66 having a top surface 68 and a bottom surface 70. A reflective layer 72 is preferably applied over all or a portion of the top surface 68 of the substrate 66. A graphic design or image 74 is preferably applied over all or a portion of the reflective layer 72. The graphic design or image 74 may comprise a plurality of layers in order to provide the desired design. The graphic design or image 74 may also include one or more hidden or latent images 76 printed within the design. A clear plastic layer 69 is then preferably applied over and/or around the graphic design or image 74. This clear plastic layer is preferably a clear plastic laminate that is impressed, stamped, embossed or otherwise formed with a plurality of light controlling lines or lenses 79 that are semi-circular in cross-section. This textured pattern of lines 79 can be formed over the entire surface of the graphic design or image 74 or over only a portion thereof. The textured pattern 79 preferably includes a plurality of parallel lines 67 stamped into bands, rays or sections 60 over the graphic design or image 74 to create the same visual effect as described above.

Figure 16:
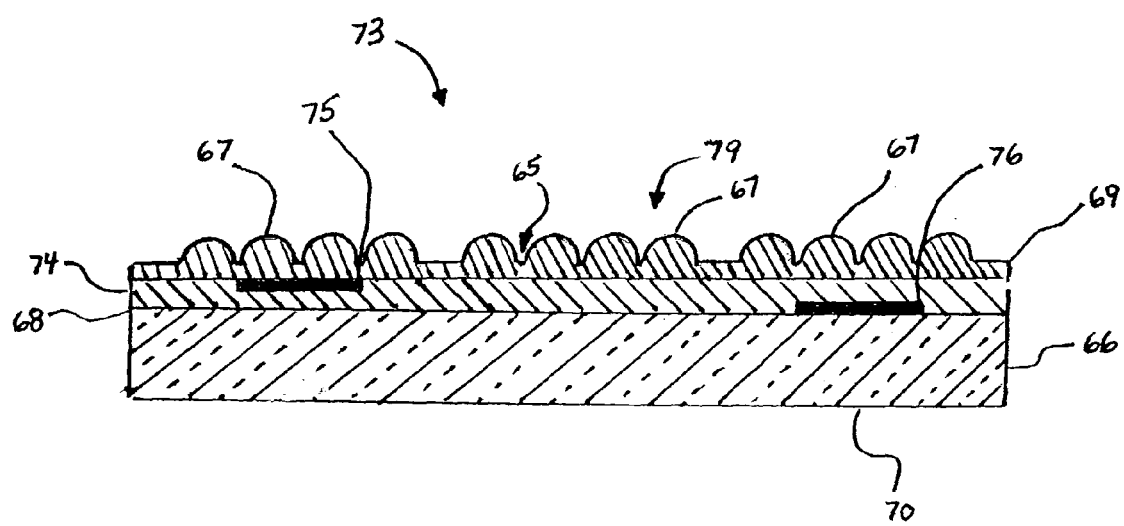
FIG. 16 is an enlarged cross-sectional view of a sixth embodiment of a printed article produced in accordance with the present invention.

FIG. 16 illustrates an enlarged cross-sectional view of an embodiment of a printed article, similar to the embodiment shown in FIG. 5. The printed article 73 includes a substrate 66 having a top surface 68 and a bottom surface 70. A graphic design or image 74 is applied over all or a portion of the top surface 68 of the substrate 70. The graphic design or image 74 may comprise hidden or latent images 76. A clear plastic layer 69 is then preferably applied over and/or around the graphic design or image 74. This clear plastic layer is preferably a clear plastic laminate that is impressed, stamped, embossed or otherwise formed with a plurality of light controlling lines or lenses 79 that are semi-circular in cross-section. This textured pattern of lines 79 can be formed over the entire surface of the graphic design or image 74 or over only a portion thereof. The textured pattern 79 preferably includes a plurality of parallel lines 67 stamped into bands, rays or sections 60 over the graphic design or image 74 to create the same visual effect as described above.

Figure 17:
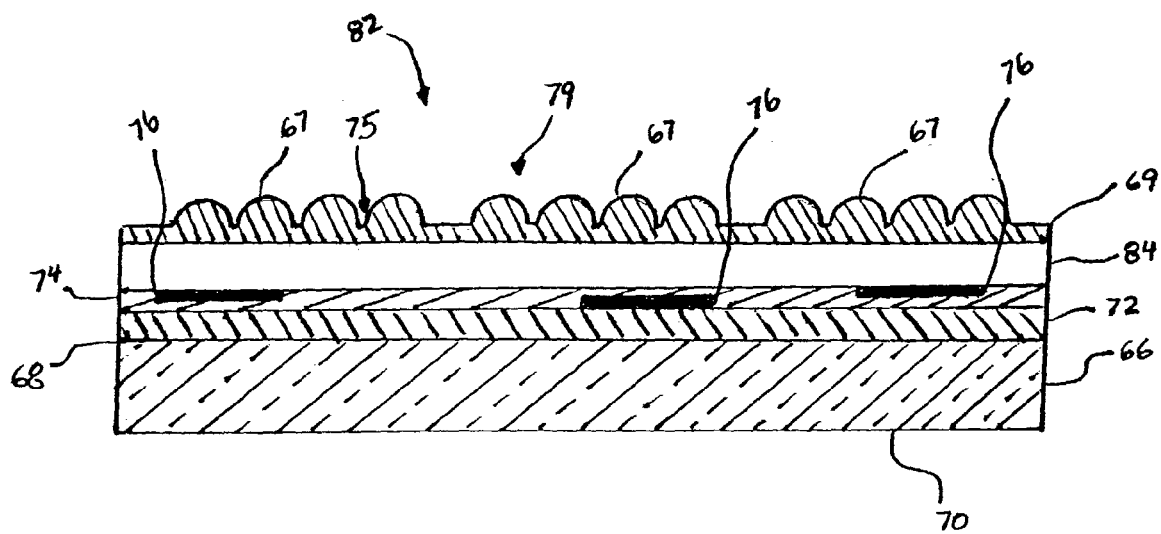
FIG. 17 is an enlarged cross-sectional view of a seventh embodiment of a printed article produced in accordance with the present invention.

FIG. 17 illustrates an enlarged cross-sectional view of an embodiment of a printed article 82, similar to the embodiment shown in FIG. 9. The printed article 82 includes a substrate 66 having a top surface 68 and a bottom surface 70. A reflective ink layer 72 is preferably applied over all or a portion of the top surface 68 of the substrate 70. A graphic design or image 74 is preferably applied over all or a portion of the reflective layer 72. The graphic design or image 74 may include hidden or latent images 76 incorporated within the design. A transparent glossy layer 84 is preferably applied over the graphic design or image 74 and any exposed portion of the reflective layer 72. A clear plastic layer 69 is then preferably applied over and/or around the graphic design or image 74. This clear plastic layer is preferably a clear plastic laminate that is impressed, stamped, embossed or otherwise formed with a plurality of light controlling lines or lenses 79 that are semi-circular in cross-section. This textured pattern of lines 79 can be formed over the entire surface of the graphic design or image 74 or over only a portion thereof. The textured pattern 79 preferably includes a plurality of parallel lines 67 stamped into bands, rays or sections 60 over the graphic design or image 74 to create the same visual effect as described above.

Figure 18:
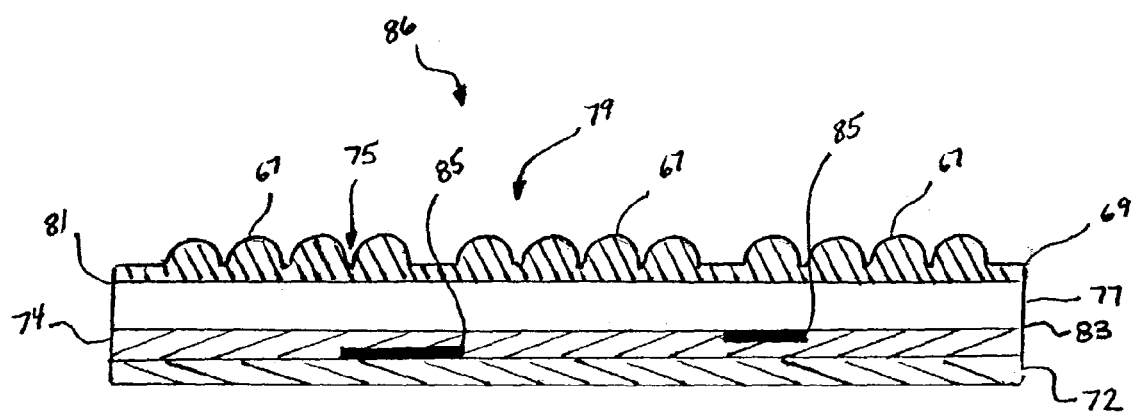
FIG. 18 is an enlarged cross-sectional view of a eighth embodiment of a printed article produced in accordance with the present invention.

FIG. 18 illustrates an enlarged cross-sectional view of an embodiment of a printed article 86, similar to the embodiment shown in FIG. 13. The printed article 86 preferably includes a clear or transparent substrate 77 having a top surface 81 and a bottom surface 83. A graphic design or image 74 is preferably applied over all or a portion of the bottom surface 81 of the substrate 77. The graphic design or image 74 may include hidden or latent images 85 printed within the design. A reflective layer 72 is preferably applied over all or a portion of the graphic design or image 74 on the bottom surface 83 of the substrate 77. A clear plastic layer 69 is then preferably applied over and/or around the graphic design or image 74. This clear plastic layer is preferably a clear plastic laminate that is impressed, stamped, embossed or otherwise formed with a plurality of light controlling lines or lenses 79 that are semi-circular in cross-section. This textured pattern of lines 79 can be formed over the entire surface of the graphic design or image 74 or over only a portion thereof. The textured pattern 79 preferably includes a plurality of parallel lines 67 stamped into bands, rays or sections 60 over the graphic design or image 74 to create the same visual effect as described above.

While the invention has been described with reference to preferred embodiments, those skilled in the art will appreciate that certain substitutions, alterations, and omissions may be made without departing from the spirit of the invention. Accordingly, the foregoing description is meant to be exemplary only and should not limit the scope of the invention set forth in the following claims.

What is claimed is:

1. A reflective printed article comprising:
   a substrate having a top surface;
   a graphic image formed over the top surface of the substrate; and
   a textured pattern formed of a plurality of lines, formed in directly adjacent sections over the surface of the graphic image opposite the substrate, wherein the plurality of lines of a section are all substantially parallel to each other and oriented in a first direction, and the plurality of lines of a directly adjacent section are all substantially parallel to each other and oriented in a second direction different from the first direction, such that the plurality of parallel lines in each section reflect light in a direction different than that of the adjacent section.

2. The printed article of claim 1 wherein the textured pattern is formed in a clear plastic laminate.

3. The printed article of claim 2 wherein the textured pattern comprises a plurality of light controlling lines having a semi-circular cross-section.

4. The printed article of claim 1 wherein the graphic image is formed over only a portion of the top surface of the substrate.

5. The printed article of claim 1 wherein the textured pattern is formed over only a portion of the graphic image on the top surface of the substrate.

6. The printed article of claim 1 wherein the graphic image comprises a plurality of ink layers having at least one hidden image lightly printed among the ink layers.

7. The printed article of claim 1 further comprising a reflective layer formed on the top surface of the substrate and underneath the graphic image.

8. A reflective printed article comprising:
a substrate having a top surface;
a graphic image formed over the top surface of the substrate;
a textured pattern formed of a plurality of substantially parallel lines, formed in adjacent sections over the graphic image, and the plurality of parallel lines of an adjacent section are all oriented in a first direction, and the plurality of parallel lines of an adjacent section are all oriented in a second direction different from the first direction, such that the plurality of parallel lines in each section reflect light in a direction different than that of the adjacent section;
a glossy layer of a clear coating formed over the graphic image and underneath the textured pattern.

9. The printed article of claim 1 wherein the substrate includes a bottom surface with a second graphic image formed on the bottom surface of the substrate and a second textured pattern formed on the second graphic image.

10. A reflective printed article comprising:
a substrate having a top surface;
a reflective layer formed over the top surface of the substrate;
a graphic image formed over the reflective layer; and
a textured pattern formed of a plurality of lines, formed in directly adjacent sections over the surface of the graphic image opposite the substrate, wherein the plurality of lines of a section are all substantially parallel to each other and oriented in a first direction, and the plurality of lines of a directly adjacent section are all substantially parallel to each other and oriented in a second direction different from the first direction, such that the plurality of parallel lines in each section reflect light in a direction different than that of the adjacent section.

11. The reflective printed article of claim 10 wherein the textured pattern is formed in a clear plastic laminate.

12. The reflective printed article of claim 11 wherein the textured pattern comprises a plurality of light controlling lines having a semi-circular cross-section.

13. The reflective printed article of claim 10 wherein the graphic image is formed over only a portion of the reflective layer.

14. The reflective printed article of claim 10 wherein the textured clear plastic laminate is formed over only a portion of the graphic image.

15. The reflective printed article of claim 10 wherein the graphic image comprises a plurality of ink layers having at least one hidden image lightly printed among the ink layers.

16. The reflective printed article of claim 15 wherein the substrate includes a bottom surface with a second reflective layer formed on the bottom surface of the substrate, a second graphic image formed on the second reflective layer and a second textured pattern formed on the second graphic image.

17. A reflective printed article comprising:
a substrate having a top surface;
a reflective layer formed over the top surface of the substrate;
a graphic image formed over the reflective layer;
a glossy layer of a clear coating formed over the graphic image; and
a textured pattern formed of a plurality of lines, formed in directly adjacent sections over the surface of the glossy layer opposite the substrate, wherein the plurality of lines of a section are all substantially parallel to each other and oriented in a first direction, and the plurality of lines of an adjacent section are all substantially parallel to each other and oriented in a second direction different from the first direction, such that the plurality of parallel lines in each section reflect light in a direction different than that of the adjacent section.

18. The reflective printed article of claim 17 wherein the textured pattern is formed in a clear plastic laminate.

19. The reflective printed article of claim 18 wherein the textured pattern comprises a plurality of light controlling lines having a semi-circular cross-section.

20. A printed article comprising:
a substrate having a top surface and a bottom surface;
a graphic image formed on the bottom surface of the substrate;
a reflective layer formed over the graphic image on the bottom surface of the substrate; and
a textured pattern formed of a plurality of lines, formed in directly adjacent sections over the top surface of the substrate, wherein the plurality of lines of a section are all substantially parallel to each other and oriented in a first direction, and the plurality of lines of a directly adjacent section are all substantially parallel to each other and oriented in a second direction different from the first direction, such that the plurality of parallel lines in each section reflect light in a direction different than that of the adjacent section.

21. A reflective printed article comprising:
a reflective substrate having a top surface;
a graphic image formed over the top surface of the substrate; and
a transparent textured pattern of a plurality of lines printed in directly adjacent sections over the surface of the graphic image opposite the substrate, wherein the plurality of lines of a section are all substantially parallel to each other and oriented in a first direction, and the plurality of lines of a directly adjacent section are all substantially parallel to each other and oriented in a second direction or a third direction, the second and third directions being different from the first direction, such that the plurality of parallel lines in each directly section reflect light in different directions.

22. The printed article of claim 21 wherein the graphic image is formed over only a portion of the top surface of the substrate.

23. The printed article of claim 21 wherein the textured pattern is formed over only a portion of the graphic image on the top surface of the substrate.

24. The printed article of claim 21 wherein the graphic image comprises a plurality of ink layers having at least one hidden image lightly printed among the ink layers.

25. The printed article of claim 21 wherein the textured pattern is formed of transparent ink having rheological properties such that when the ink is printed, the ink flows into lines having a semi-cylindrical or convex shape when viewed in cross-section.

26. The printed article of claim 25 wherein the transparent ink includes glitter or pearls.

27. The printed article of claim 21 further comprising a reflective layer formed on the top surface of the substrate and underneath the graphic image.

28. The printed article of claim 21 further comprising a glossy layer of a clear coating formed over the graphic image and underneath the textured pattern.

29. The printed article of claim 21 wherein the substrate includes a bottom surface with a second graphic image formed on the bottom surface of the substrate and a second textured pattern formed on the graphic image.

30. A reflective printed article comprising:
a substrate having a top surface;
a reflective layer formed over the top surface of the substrate;
a graphic image formed over the reflective layer; and
a transparent textured pattern of a plurality of lines printed in directly adjacent sections over the surface of the graphic image opposite the substrate, wherein the plurality of lines of a section are all substantially parallel to each other and oriented in a first direction, and the plurality of lines of a directly adjacent section are all substantially parallel to each other and oriented in a second direction or a third direction, the second and third directions being different from the first direction, such that the plurality of parallel lines in each section reflect light in different directions.

31. The printed article of claim 30 wherein the graphic image is formed over only a portion of the reflective layer.

32. The printed article of claim 30 wherein the textured pattern of lines is formed over only a portion of the graphic image.

33. The printed article of claim 30 wherein the graphic image comprises a plurality of ink layers having at least one hidden image lightly printed among the ink layers.

34. The printed article of claim 30 wherein the textured pattern is formed of transparent ink having rheological properties such that when the ink is printed, the ink flows into lines having a semi-spherical or convex shape when viewed in cross-section.

35. The printed article of claim 30 wherein the substrate includes a bottom surface with a second reflective layer formed on the bottom surface of the substrate, a second graphic image formed on the reflective layer and a second textured pattern of lines formed on the graphic image.

36. A reflective printed article comprising:
a substrate having a top surface;
a reflective layer formed over the top surface of the substrate;
a graphic image formed over the reflective layer;
a glossy layer of a clear coating formed over the graphic image; and
a transparent textured pattern of a plurality of lines printed in directly adjacent sections over the surface of the glossy layer opposite the substrate, wherein the plurality of lines of a section are all substantially parallel to each other and oriented in a first direction, and the plurality of lines of a directly adjacent section are all substantially parallel to each other and oriented in a second direction or a third direction, the second and third directions being different from the first direction, such that the plurality of parallel lines in each section reflect light in different directions.

37. The printed article of claim 36 wherein the textured pattern is formed of opaque ink having rheological properties such that when the ink is printed, the ink flows into lines having a semi-spherical or convex shape when viewed in cross-section.

38. The printed article of claim 36 wherein the textured pattern is formed of semi-transparent ink having rheological properties such that when the ink is printed, the ink flows into lines having a semi-spherical or convex shape when viewed in cross-section.

39. The printed article of claim 36 wherein the textured pattern is formed of translucent ink having rheological properties such that when the ink is printed, the ink flows into lines having a semi-spherical or convex shape when viewed in cross-section.

40. A method of forming a reflective printed article, the method comprising the steps of:
providing a substrate having a top surface;
forming a reflective layer over the top surface of the substrate;
forming a graphic image over the reflective layer; and
forming a transparent textured pattern of a plurality of lines printed in directly adjacent sections over the surface of the graphic image opposite the substrate, wherein the plurality of lines of a section are all substantially parallel to each other and oriented in a first direction, and the plurality of lines of a directly adjacent section are all substantially parallel to each other and oriented in a second direction or a third direction, the second and third directions being different from the first direction, such that the plurality of parallel lines in each section reflect light in different directions.

41. The method of claim 40 wherein the graphic image is formed over only a portion of the reflective layer.

42. The method of claim 40 wherein the textured pattern of lines is formed only over a portion of the graphic image.

43. The method of claim 40 wherein the textured pattern is formed of transparent ink having rheological properties such that when the ink is printed, the ink flows into lines having a semi-spherical or convex shape when viewed in cross-section.

44. A printed article comprising:
a substrate having a top surface and a bottom surface;
a graphic image formed on the bottom surface of the substrate;
a reflective layer formed over the graphic image on the bottom surface of the substrate; and
a transparent textured pattern of a plurality of lines printed in directly adjacent sections over the top surface of the substrate, wherein the plurality of lines of a section are all substantially parallel to each other and oriented in a first direction, and the plurality of lines of a directly adjacent section are all substantially parallel to each other and oriented in a second direction or a third direction, the second and third directions being different from the first direction.

* * * * *

UNITED STATES PATENT AND TRADEMARK OFFICE
CERTIFICATE OF CORRECTION

PATENT NO. : 7,290,803 B2  
APPLICATION NO. : 10/376130  
DATED : November 6, 2007  
INVENTOR(S) : Scarbrough et al.

Page 1 of 1

It is certified that error appears in the above-identified patent and that said Letters Patent is hereby corrected as shown below:

Column 11  
Line 7, the word "and" should be deleted and replaced with the word --wherein--

Column 11  
Lines 7 and 8, the words "an adjacent" should be deleted and replaced with the word --a--

Signed and Sealed this

Thirteenth Day of May, 2008

JON W. DUDAS  
*Director of the United States Patent and Trademark Office*